(12) United States Patent
Shingu et al.

(10) Patent No.: US 12,139,777 B2
(45) Date of Patent: *Nov. 12, 2024

(54) ALUMINUM ALLOY FOIL, LAMINATE, METHOD OF PRODUCING ALUMINUM ALLOY FOIL, AND METHOD OF PRODUCING LAMINATE

(71) Applicant: TOYO ALUMINIUM KABUSHIKI KAISHA, Osaka (JP)

(72) Inventors: Akira Shingu, Osaka (JP); Mitsunari Ooyagi, Osaka (JP)

(73) Assignee: TOYO ALUMINIUM KABUSHIKI KAISHA, Osaka (JP)

( * ) Notice: Subject to any disclaimer, the term of this patent is extended or adjusted under 35 U.S.C. 154(b) by 266 days.

This patent is subject to a terminal disclaimer.

(21) Appl. No.: 17/439,640

(22) PCT Filed: Mar. 17, 2020

(86) PCT No.: PCT/JP2020/011685
§ 371 (c)(1),
(2) Date: Sep. 15, 2021

(87) PCT Pub. No.: WO2020/189673
PCT Pub. Date: Sep. 24, 2020

(65) Prior Publication Data
US 2022/0186345 A1    Jun. 16, 2022

(30) Foreign Application Priority Data
Mar. 18, 2019   (JP) .................................. 2019-049454

(51) Int. Cl.
C22C 21/00    (2006.01)
C22F 1/04     (2006.01)

(52) U.S. Cl.
CPC ................ *C22C 21/00* (2013.01); *C22F 1/04* (2013.01)

(58) Field of Classification Search
None
See application file for complete search history.

(56) References Cited

U.S. PATENT DOCUMENTS 11,827,956 B2 * 11/2023 Shingu .................... B32B 27/34
2018/0281036 A1 * 10/2018 Shingu ................ H01L 31/0392
2020/0080171 A1    3/2020 Shingu et al.

FOREIGN PATENT DOCUMENTS

CN    101086049 A    12/2007
CN    101289720 A    10/2008
(Continued)

OTHER PUBLICATIONS

Chinese Office Action and Search Report for Chinese Application No. 202080021561.3, dated Mar. 3, 2022, with an English translation.

(Continued)

*Primary Examiner* — Daniel J. Schleis
(74) *Attorney, Agent, or Firm* — Birch, Stewart, Kolasch & Birch, LLP

(57) ABSTRACT

An aluminum alloy foil includes: aluminum; silicon; manganese; iron; zinc; copper; and magnesium. In the aluminum alloy foil, a total of a content of the silicon and a content of the iron is less than or equal to 0.1 mass %. In the aluminum alloy foil, a ratio of a mass of the manganese to a total mass of the silicon and the iron is more than or equal to 7.0. In the first surface, an area ratio of second phase particles each having an equivalent circle diameter of more than or equal to 1.5 μm is less than or equal to 0.1%.

20 Claims, 2 Drawing Sheets

(56) References Cited

FOREIGN PATENT DOCUMENTS

| | | |
|---|---|---|
| CN | 101519760 A | 9/2009 |
| CN | 107249766 A | 10/2017 |
| EP | 2 881 478 A1 | 6/2015 |
| JP | 6-256916 A | 9/1994 |
| JP | 6-278243 A | 10/1994 |
| JP | 2002-129297 A | 5/2002 |
| JP | 2002-161322 A | 6/2002 |
| JP | 2009-57579 A | 3/2009 |
| JP | 2011-9392 A | 1/2011 |
| WO | WO 2014/034240 A1 | 3/2014 |
| WO | WO 2016/125608 A1 | 8/2016 |
| WO | WO2016125608 * | 8/2016 |
| WO | WO 2018/123933 A1 | 7/2018 |

OTHER PUBLICATIONS

Chinese Office Action and Search Report for Chinese Application No. 202080021642.3, dated Feb. 25, 2022, with an English translation.

Extended European Search Report for European Application No. 20774759.3, dated Nov. 16, 2022.

Indian Office Action for Indian Application No. 202117046829, dated Dec. 20, 2023, with English translation.

Indian Office Action for Indian Application No. 202117046629, dated Nov. 9, 2022, with an English translation.

Wang, "The Environmental Footprint of Semi-Fabricated Aluminum Products in North America", The Aluminum Association, Jan. 31, 2022, pp. 1-157 (158 pages total).

* cited by examiner

ALUMINUM ALLOY FOIL, LAMINATE, METHOD OF PRODUCING ALUMINUM ALLOY FOIL, AND METHOD OF PRODUCING LAMINATE

CROSS REFERENCE TO RELATED APPLICATIONS

This application is the National Phase of PCT International Application No. PCT/JP2020/011685, filed on Mar. 17, 2020, which claims priority under 35 U.S.C. 119(a) to Patent Application No. 2019-049454, filed in Japan on Mar. 18, 2019, all of which are hereby expressly incorporated by reference into the present application.

TECHNICAL FIELD

The present invention relates to an aluminum alloy foil, a laminate, a method of producing the aluminum alloy foil, and a method of producing the laminate.

BACKGROUND ART

In recent years, in order to reduce environmental loads, airplanes, railroad vehicles, or automobiles, which are used as transportation means, have been required to be further reduced in weight. Also, for the sake of handling, various types of mechanical parts, electric/electronic application related parts, construction materials, and members used in the field of home applications or the like have been required to be further reduced in weight.

In view of such a background, when a metal material is used for each of these members, the member is reduced in weight by using aluminum and/or aluminum alloy each having a lower density instead of using iron/steel material or copper each having a relatively high density.

On the other hand, a general aluminum alloy is likely to be corroded when exposed to water, moisture, salt water, or the like. To address this, WO 2018/123933 proposes an aluminum alloy foil having high corrosion resistance against water, moisture, salt water, or the like. In the aluminum alloy foil disclosed in WO 2018/123933, a decrease in weight due to corrosion is suppressed.

CITATION LIST

Patent Literature

PTL 1: WO 2018/123933

SUMMARY OF INVENTION

Technical Problem

For each of some parts to be used in an environment exposed to water, moisture, salt water, or the like, the corrosion resistance of a surface of the part is particularly important. For example, in the case of a construction material, it is particularly important to reduce the area ratio of a corroded region on a surface thereof from the viewpoint of aesthetics, whereas in the case of an electric/electronic application related part, it is particularly important to reduce the area ratio of a corroded region on a surface thereof from the viewpoint of electric conductivity of the surface.

The present inventors have arrived at the present invention to provide an aluminum alloy foil and a laminate so as to attain improved corrosion resistance of a surface thereof against salt water as compared with the aluminum alloy foil of WO 2018/123933 while attaining moisture/heat resistance comparable to that of the aluminum alloy foil of WO 2018/123933.

Solution to Problem

An aluminum alloy foil according to the present invention is an aluminum alloy foil having a first surface. The aluminum alloy foil includes: aluminum; silicon; more than or equal to 0.4 mass % and less than or equal to 3.04 mass % of manganese; more than or equal to 0.03 mass % and less than or equal to 0.08 mass % of iron; more than or equal to 0.00001 mass % and less than or equal to 0.03 mass % of zinc; more than or equal to 0.00001 mass % and less than or equal to 0.02 mass % of copper; and more than or equal to 0.00001 mass % and less than or equal to 0.01 mass % of magnesium. In the aluminum alloy foil, a total of a content of the silicon and a content of the iron is less than or equal to 0.1 mass %. In the aluminum alloy foil, a ratio of a content of the manganese to a total content of the silicon and the iron is more than or equal to 7.0. In the first surface, an area ratio of second phase particles each having an equivalent circle diameter of more than or equal to 1.5 μm is less than or equal to 0.1%.

Advantageous Effects of Invention

According to the present invention, there can be provided an aluminum alloy foil and a laminate to attain improved corrosion resistance of a surface thereof against salt water as compared with the above-described aluminum alloy foil.

DESCRIPTION OF EMBODIMENTS

Figure 1:
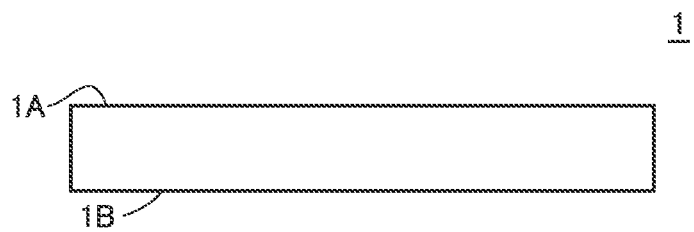
FIG. 1 is a schematic cross sectional view for illustrating an aluminum foil according to the present embodiment.

Hereinafter, embodiments of the present invention will be described with reference to figures. It should be noted that in the figures described below, the same or corresponding portions are denoted by the same reference characters, and will not be described repeatedly.

<Configuration of Aluminum Alloy Foil>

First, as shown in FIG. 1, an aluminum alloy foil 1 according to the present embodiment will be described. Aluminum alloy foil 1 has a first surface 1A and a second surface 1B opposite to first surface 1A. Each of first surface 1A and second surface 1B has, for example, a quadrangular shape. Each of first surface 1A and second surface 1B of aluminum alloy foil 1 refers to a surface having the largest surface area among surfaces that can be confirmed by eyes, a microscope, or the like in an external appearance of aluminum alloy foil 1. Strictly, oxide films are formed at first surface 1A and second surface 1B of aluminum alloy foil 1, and first surface 1A and second surface 1B of aluminum alloy foil 1 in the present invention refer to main surfaces of aluminum alloy foil 1 including these oxide films.

Aluminum alloy foil 1 includes aluminum (Al), silicon (Si), manganese (Mn), zinc (Zn), iron (Fe), copper (Cu), and magnesium (Mg). The remainder of aluminum alloy foil 1 is constituted of an impurity. The impurity is, for example, an inevitable impurity; however, in addition to the inevitable impurity, a small amount of impurity that does not significantly affect salt water resistance and moisture/heat resistance may be included. Examples of the impurity include at least one element selected from a group consisting of vanadium (V), titanium (Ti), zirconium (Zr), chromium (Cr), nickel (Ni), boron (B), gallium (Ga), bismuth (Bi), and the like. The content of aluminum in aluminum alloy foil 1 is more than or equal to 96.0 mass %. Preferably, the content of each element included as the impurity in aluminum alloy foil 1 is less than or equal to 0.05 mass %.

(1) Content of Manganese (Mn)

Aluminum alloy foil 1 includes more than or equal to 0.4 mass % and less than or equal to 3.04 mass % of manganese. The manganese in aluminum alloy foil 1 serves to improve the strength of aluminum alloy foil 1 without significantly decreasing the corrosion resistance of first surface 1A against salt water (hereinafter, referred to as "salt water resistance"). When the content of the manganese is less than 0.4 mass %, the strength and surface hardness are insufficient. On the other hand, when the content of the manganese is more than 3.04 mass %, the hardness of the aluminum alloy is extremely high to cause deteriorated rollability, with the result that the aluminum foil cannot be rolled.

(2) Content of Iron (Fe)

Aluminum alloy foil 1 includes more than or equal to 0.03 mass % and less than or equal to 0.08 mass % of iron. The iron in aluminum alloy foil 1 serves to improve corrosion resistance of first surface 1A in a high-temperature and high-humidity atmosphere. When the content of the iron is less than 0.03 mass %, the corrosion resistance of first surface 1A in the high-temperature and high-humidity atmosphere (hereinafter, referred to as "moisture/heat resistance") is insufficient. On the other hand, when the content of the iron is more than 0.08 mass %, the salt water resistance, particularly, the salt water resistance at −40 to 60° C. is significantly decreased as compared with the case where the content of the iron is less than or equal to 0.08 mass %. Preferably, the content of the iron obtained when using a filter having an average equivalent circle diameter of 1 μm to filter a solution obtained by dissolving the aluminum alloy foil in phenol is more than or equal to 100 mass ppm and less than or equal to 400 mass ppm with respect to the total mass of the aluminum alloy foil yet to be dissolved. When the content of the iron falls within the above range, the moisture/heat resistance and the salt water resistance can be further improved without decreasing the surface hardness.

(3) Content of Zinc (Zn)

Aluminum alloy foil 1 includes more than or equal to 0.00001 mass % and less than or equal to 0.03 mass % of zinc. The zinc in aluminum alloy foil 1 serves to decrease the salt water resistance and moisture/heat resistance of first surface 1A. When the content of the zinc is more than 0.03 mass %, the salt water resistance and moisture/heat resistance of first surface 1A are decreased as compared with the case where the content of the zinc is less than or equal to 0.03 mass %. The lower limit value of the content of the zinc is not particularly limited, but is, for example, 0.00001 mass % in view of production cost. This is due to the following reason: in order to attain a content of the zinc of less than 0.00001 mass %, it is necessary to repeatedly perform a trinal electrolytic method multiple times, with the result that the production cost becomes significantly high in this case. Preferably, the content of the zinc is more than or equal to 0.0001 mass %.

(4) Content of Copper (Cu)

Aluminum alloy foil 1 includes more than or equal to 0.00001 mass % and less than or equal to 0.02 mass % of copper. The copper in aluminum alloy foil 1 serves to decrease the salt water resistance and moisture/heat resistance of first surface 1A. When the content of the copper is more than 0.02 mass %, the salt water resistance and moisture/heat resistance of first surface 1A are decreased as compared with the case where the content of the copper is less than or equal to 0.02 mass %. The lower limit value of the content of the copper is not particularly limited, but is, for example, 0.00001 mass % in view of production cost. This is due to the following reason: in order to attain a content of the copper of less than 0.00001 mass %, it is necessary to repeatedly perform a fractional crystallization method multiple times in addition to the trinal electrolytic method, with the result that the production cost becomes significantly high in this case. Preferably, the content of the copper is more than or equal to 0.0001 mass %. The content of the copper is preferably less than or equal to 0.01 mass % because the salt water resistance can be improved in this case, and the content of the copper is more preferably less than or equal to 0.005 mass %.

(5) Content of Magnesium (Mg)

Aluminum alloy foil 1 includes more than or equal to 0.00001 mass % and less than or equal to 0.01 mass % of magnesium. The magnesium in aluminum alloy foil 1 is an element that does not significantly adversely affect the corrosion resistance of first surface 1A. However, when the content of the magnesium is more than 0.01 mass %, the magnesium is concentrated in the oxide film formed at first surface 1A, with the result that defects are likely to be generated in the oxide film. When aluminum alloy foil 1 forms a laminate 10 together with another layer formed on first surface 1A, the defects in the oxide film cause delamination at a joining interface between aluminum alloy foil 1 and the other layer. Preferably, the upper limit value of the content of the magnesium is less than or equal to 0.005 mass %, and is more preferably less than or equal to 0.001 mass %. The lower limit value of the content of the magnesium is not particularly limited, but is, for example, 0.00001 mass % in view of production cost. This is due to the following reason: in order to attain a content of the magnesium of less than 0.00001 mass %, it is necessary to repeatedly perform the trinal electrolytic method multiple times, with the result that the production cost becomes significantly high in this case.

(6) Total of Contents of Silicon and Iron

In aluminum alloy foil 1, the total of the content of the silicon and the content of the iron is less than or equal to 0.1 mass %. When the silicon is included in aluminum alloy foil 1, the moisture/heat resistance of first surface 1A is improved as compared with the case where silicon is not included in aluminum alloy foil 1. That is, the silicon and iron in aluminum alloy foil 1 serves to improve the moisture/heat resistance of first surface 1A. On the other hand, as the content of the silicon in aluminum alloy foil 1 is higher, the corrosion resistance in a salt water environment is more decreased, thus resulting in occurrence of pitting corrosion. In order to suppress the pitting corrosion from occurring due to the silicon and suppress the salt water resistance from being decreased due to the iron, the total of the content of the silicon and the content of the iron is less than or equal to 0.1 mass %. Preferably, the total of the content of the silicon and the content of the iron is less than or equal to 0.08 mass %.

(7) Ratio of Total of Contents of Silicon and Iron to Content of Manganese

It is assumed that $M_1$ represents the content of the manganese in aluminum alloy foil 1, $M_2$ represents the content of the silicon, and $M_3$ represents the content of the iron. A ratio $M_1/(M_2+M_3)$, i.e., a ratio of the content of the manganese to the total content of the silicon and the iron in aluminum alloy foil 1 is more than or equal to 7.0. The present inventors confirmed that even when aluminum alloy foil 1 satisfies all of the above-described compositions, contents, and total of the content of the silicon and the content of the iron, if ratio $M_1/(M_2+M_3)$ is less than 7.0, the salt water resistance of first surface 1A is insufficient (see a below-described Comparative Example 3). A reason for this is not clear; however, when the content of the manganese is smaller than the total of the content of the silicon and the content of the iron, a large amount of Al—Fe-based second phase particles or Al—Fe—Si-based second phase particles are formed in aluminum alloy foil 1. The electrolytic corrosion current values of the Al—Fe-based second phase particles and the Al—Fe—Si-based second phase particles are higher than the electrolytic corrosion current values of Al—Mn—Fe-based second phase particles and Al—Mn—Fe—Si-based second phase particles. Therefore, when ratio $M_1/(M_2+M_3)$ is less than 7.0, it is considered that pitting corrosion is likely to occur in first surface 1A due to salt water, and the salt water resistance of first surface 1A is decreased as compared with the salt water resistance of first surface 1A when ratio $M_1/(M_2+M_3)$ is more than or equal to 7.0. Preferably, ratio $M_1/(M_2+M_3)$ is more than or equal to 8.0.

The composition of aluminum alloy foil 1 is measured by inductively coupled plasma atomic emission spectroscopy. Examples of a measurement device include: iCAP6500DUO manufactured by Thermo Fisher Scientific; ICPS-8100 manufactured by Shimadzu Corporation; or the like.

(8) Area Ratio of Second Phase Particles

In a quadrangular visual field (128.2 μm×95.8 μm) of 0.01228 mm² in first surface 1A, the area ratio of second phase particles each having an equivalent circle diameter of more than or equal to 1.5 μm is less than or equal to 0.1%. The present inventors confirmed that even when aluminum alloy foil 1 satisfies all of the above-described compositions, contents, total of the content of the silicon and the content of the iron, and ratio of the content of the manganese to the total of the content of the silicon and the content of the iron, if the area ratio of the second phase particles each having an equivalent circle diameter of more than or equal to 1.5 μm is more than 0.1%, the salt water resistance of first surface 1A is insufficient in some cases (see below-described Comparative Examples 2, 4, 5, 16, 18, and 19). A reason for this is not clear. However, in the aluminum alloy foil, it has been known that aluminum hydrate generated in the vicinity of the surface thereof as pitting corrosion progresses is grown to cover the pitting corrosion portion, thereby providing a function of suppressing the progress of the pitting corrosion. It is considered that when the area ratio of the second phase particles each having an equivalent circle diameter of more than or equal to 1.5 μm is more than 0.1%, the above function is less likely to be exhibited, with the result that the salt water resistance of first surface 1A is decreased. It should be noted that the second phase particles include at least one type of second phase particles selected from a group consisting of the Al—Fe-based second phase particles, the Al—Fe—Si-based second phase particles, the Al—Mn—Fe-based second phase particles, and the Al—Mn—Fe—Si-based second phase particles. That is, the material of each of the second phase particles includes at least one element selected from a group consisting of silicon, manganese, and iron.

(9) Number Density of Second Phase Particles

In a quadrangular visual field of 0.01228 mm² (128.2 μm×95.8 μm) in first surface 1A, the number of the second phase particles each having an equivalent circle diameter of more than or equal to 1.5 μm per unit area (hereinafter, referred to as "number density") is less than or equal to 10/0.01228 mm². Preferably, the number density of the second phase particles each having an equivalent circle diameter of more than or equal to 1.5 μm in the quadrangular visual field is less than 4/0.01228 mm². The present inventors confirmed that even when aluminum alloy foil 1 satisfies all of the above-described compositions, contents, total of the content of the silicon and the content of the iron, and ratio of the content of the manganese to the contents of the silicon and iron, if the number density of the second phase particles each having an equivalent circle diameter of more than or equal to 1.5 μm is more than 10/0.01228 mm², the salt water resistance of first surface 1A is insufficient in some cases (see below-described Comparative Examples 2 and 19). When the number density of the second phase particles each having an equivalent circle diameter of more than or equal to 1.5 μm is more than 10/0.01228 mm², the area ratio of the second phase particles is more than 0.1%. Therefore, it is considered that when the number density of the second phase particles each having an equivalent circle diameter of more than or equal to 1.5 μm is more than 10/0.01228 mm², the above-described function of suppressing the progress of the pitting corrosion by the aluminum hydrate is less likely to be exhibited, thus resulting in decreased salt water resistance of first surface 1A.

The number density and area ratio of the second phase particles of aluminum alloy foil 1 are measured from a quadrangular visual field of 0.01228 mm² (128.2 μm×95.8 μm) in a reflected electron image using a scanning electron microscope (SEM).

(10) Vickers Hardness of First Surface

The Vickers hardness of first surface 1A of aluminum alloy foil 1 is more than or equal to 55 HV. The Vickers hardness is measured as a Vickers hardness (HV0.025) obtained after fixing a test piece on a glass plate having a thickness of, for example, 3 mm and pressing the test piece at a test force of 245.2 mN for 5 seconds through application of pressure provided by a diamond indenter.

(11) Thickness of Aluminum Alloy Foil

The thickness of aluminum alloy foil 1 in a direction intersecting first surface 1A is preferably more than or equal to 5 μm in view of strength and ease of production, and is preferably less than or equal to 300 μm in view of reduction in weight. More preferably, the thickness of aluminum alloy foil 1 is more than or equal to 5 μm and less than or equal to 200 μm. Aluminum alloy foil 1 has a thickness falling within the above range by casting and rolling or by casting, rolling and heat treatment.

<Method of Producing Aluminum Alloy Foil>

Figure 2:
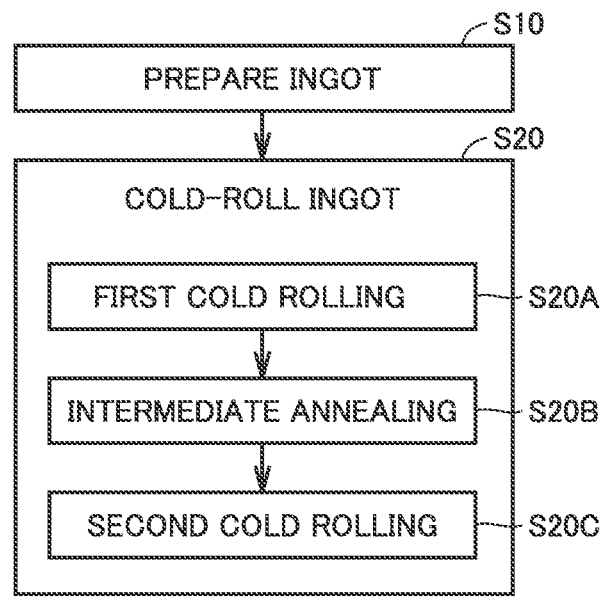
FIG. 2 is a flowchart showing a method of producing the aluminum foil according to the present embodiment.

Next, the following describes an exemplary method of producing aluminum alloy foil 1 according to the present embodiment. As shown in FIG. 2, the method of producing aluminum alloy foil 1 according to the present embodiment includes: a step (S10) of preparing an ingot; and a step (S20) of cold-rolling the ingot.

First, the ingot is prepared (step (S10)). Specifically, the ingot is prepared in the following manner: molten aluminum having a predetermined composition is prepared, solidified, and casted. The molten aluminum is prepared by, for example, adding iron or an aluminum-iron hardener and manganese or an aluminum-manganese hardener to melted aluminum ingot. A casting method is not particularly limited, but is, for example, semi-continuous casting, continuous casting, or mold casting. The contents of silicon (Si), manganese (Mn), zinc (Zn), iron (Fe), copper (Cu), and magnesium (Mg) in the molten aluminum are controlled to attain the above-described composition of aluminum alloy foil 1.

Next, the ingot is cold-rolled (step (S20)). In this step, the ingot prepared in the above step (S10) is cold-rolled without performing homogenization heat treatment and hot rolling. Each of the area ratio of the second phase particles in the surface of the ingot to be cold-rolled in this step and the area ratio of the second phase particles in the surface of the ingot prepared in the preparation step (S10) is less than or equal to 0.1%. In other words, an amount of heat applied to the ingot between the step (S10) and the step (S20) is less than the total of amounts of heat applied to the ingot and a hot-rolled member in the case where the homogenization heat treatment and the hot rolling are performed. The cold rolling is performed multiple times with an intermediate annealing step being performed between the cold rolling steps, for example. For example, first, a first cold rolling step (520A) is performed onto the ingot to form a rolled member. Next, the obtained rolled member is subjected to an intermediate annealing step (S20B). The intermediate annealing may be performed under general operating conditions, but is performed under such conditions that, for example, an annealing temperature is more than or equal to 50° C. and less than or equal to 600° C. and an annealing time is more than or equal to 1 second and less than or equal to 20 hours. Next, the rolled member having been through the annealing is subjected to a second cold rolling step (S20C) to form a cold-rolled member. Preferably, the annealing temperature is more than or equal to 150° C. and less than or equal to 550° C. In this way, aluminum alloy foil 1 is produced. Further, the intermediate annealing may not be performed or may be performed multiple times between the cold rolling steps in such a manner that intermediate annealing is performed again after the second cold rolling and then third cold rolling is performed.

<Configuration of Laminate>

Figure 3:
FIG. 3 is a schematic cross sectional view showing a laminate according to the present embodiment.

Next, as shown in FIG. 3, laminate 10 according to the present embodiment will be described. Laminate 10 includes: aluminum alloy foil 1 according to the present embodiment; and a first layer 11 formed on first surface 1A of aluminum alloy foil 1. First layer 11 is configured as, for example, a film layer, and may be adhered to first surface 1A. Alternatively, first layer 11 may be configured as a coating layer formed by applying a coating material on first surface 1A. Alternatively, first layer 11 may include a film layer and a coating layer layered on each other. The material of first layer 11 may be appropriately selected in accordance with a purpose of use of laminate 10.

When first layer 11 is configured as a film layer, a wide range of films employing known resins as their materials can be employed as first layer 11, and the material of first layer 11 is not particularly limited. For example, the material of first layer 11 includes one or more selected from polyethylene, polypropylene, polybutylene, polyethylene terephthalate, polyethylene naphthalate, polyvinyl chloride, polyvinylidene chloride, polyvinyl alcohol, ethylene-vinyl acetate copolymer, polyamide, polyimide, and vinyl chloride.

A method of adhering the film layer to the aluminum alloy foil when layering the film layer on the aluminum alloy foil may be any method, and is not particularly limited. Examples of the adhering method include: a dry lamination method using a polyester-urethane-based or polyester-based two-component curing type adhesive agent; a co-extrusion method; an extrusion coating method; an extrusion lamination method; a heat sealing method; or a heat lamination method using an anchor coating agent.

When first layer 11 is configured as a coating layer, examples of the coating agent include: an inorganic coating agent including at least one selected from a group consisting of titanium oxide, silicon oxide, zirconium oxide, and chromium composition; or a resin coating agent including at least one selected from a group consisting of acrylic, polycarbonate, silicon resin, and fluororesin.

First layer 11 may be an anodic oxide coating layer or a denatured material layer formed by plasma treatment and acid and/or alkali. The thickness of first layer 11 may be appropriately set such that the thickness of laminate 10 falls within the above-described numerical range.

Such a laminate 10 is suitable for a member that requires high salt water resistance and high moisture/heat resistance because aluminum alloy foil 1 serving as a base material attains both the salt water resistance and the moisture/heat resistance in high levels as compared with the conventional aluminum alloy foil. For example, laminate 10 is also suitable for: packaging materials for packaging salt-containing beverages, foods, chemicals, and the like; construction materials such as heat insulating materials and waterproof sheets; members installed in sea; mechanical parts for ships, airplanes, automobiles, railways, and the like; covering materials for electric/electronic application related parts for the sake of prevention of moisture or electromagnetic shielding; and decoration materials. Laminate 10 may further include a resin layer formed on second surface 1B.

Figure 4:
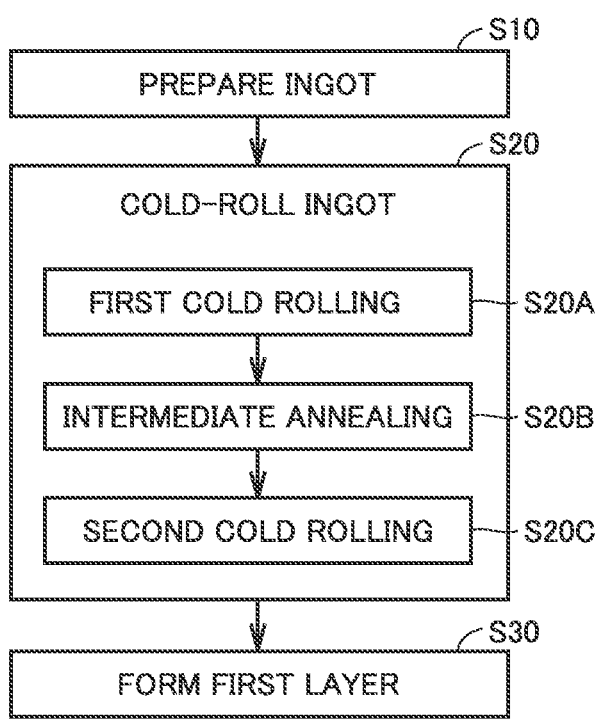
FIG. 4 is a flowchart showing a method of producing the laminate according to the present embodiment.

As shown in FIG. 4, a method of producing laminate 10 includes: a step of producing aluminum alloy foil 1 by the method of producing aluminum alloy foil 1 as described above; and a step of forming first layer 11. In other words, the method of producing laminate 10 includes: the step (S10) of preparing an ingot; the step (S20) of cold-rolling the ingot; and a step (S30) of forming first layer 11. In the step (S30) of forming first layer 11, first layer 11 is formed on first surface 1A by any method. For example, first layer 11 may be formed by adhering a film layer formed in advance to first surface 1A as described above, or first layer 11 may be formed by applying an application material having fluidity onto first surface 1A and curing the application material.

<Modification>

Before the cold rolling step, the method of producing aluminum alloy foil 1 according to the present embodiment may further include: a step of performing homogenization heat treatment onto the ingot; and a step of hot-rolling the ingot having been through the homogenization heat treatment. In this case, the homogenization heat treatment may be performed under such conditions that the area ratio of the second phase particles in the surface of the ingot having been through the homogenization heat treatment becomes less than or equal to 0.1%, for example, under such conditions that a heating temperature is more than or equal to 300° C. and less than or equal to 500° C. and a heating time is more than or equal to 1 hour and less than or equal to 20 hours. It should be noted that in the method of producing aluminum alloy foil 1 according to the present embodiment, it is preferable not to perform the step of performing the homogenization heat treatment and the step of hot-rolling.

The method of producing aluminum alloy foil 1 according to the present embodiment may further include: a step of rolling the cold-rolled member obtained by the cold rolling step. By further performing this rolling step, the thickness of aluminum alloy foil 1 is adjusted more readily. This rolling step may be performed by pack rolling.

Further, the method of producing aluminum alloy foil 1 according to the present embodiment may further include a step of performing heat treatment onto the foil obtained by the step of rolling the cold-rolled member. The heat treatment step is performed under such conditions that a heating temperature is more than or equal to 50° C. and less than or equal to 200° C. and a heating time is more than or equal to 1 second and less than or equal to 50 hours, for example. By providing the heat treatment step, rolling oil remaining on the surface of the aluminum alloy foil can be reduced to improve wettability without decreasing the surface hardness of the aluminum alloy foil.

Laminate 10 according to the present embodiment may further include a second layer (not shown) formed on second surface 1B. The second layer may have the same configuration as that of the first layer, or may have a configuration different from that of the first layer.

EXAMPLES

As described below, samples of aluminum alloy foils of examples of the present embodiment and comparative examples were prepared, and evaluations were made on salt water resistance, moisture/heat resistance, and surface hardness of each of the samples.

First, the aluminum alloy foils of the examples of the present embodiment and the comparative examples as shown in Tables 1 and 2 were produced in accordance with a below-described production process by using aluminum ingots having different compositions.

TABLE 1

| | Composition (Mass %) | | | | | | | Ratio (Si + Fe) | Mn/ (Si + Fe) | Thickness (μm) |
|---|---|---|---|---|---|---|---|---|---|---|
| | Al | Si | Fe | Cu | Mg | Zn | Mn | | | |
| Example 1 | 99.3106 | 0.0175 | 0.0456 | 0.0017 | 0.0005 | 0.0019 | 0.6163 | 0.0631 | 9.77 | 35 |
| Example 2 | 99.3106 | 0.0175 | 0.0456 | 0.0017 | 0.0005 | 0.0019 | 0.6163 | 0.0631 | 9.77 | 35 |
| Example 3 | 99.3363 | 0.0119 | 0.0358 | 0.0003 | 0.0002 | 0.0010 | 0.6085 | 0.0477 | 12.75 | 60 |
| Example 4 | 98.5932 | 0.0118 | 0.0355 | 0.0003 | 0.0002 | 0.0010 | 1.3520 | 0.0474 | 28.55 | 60 |
| Example 5 | 99.1390 | 0.0119 | 0.0357 | 0.0003 | 0.0002 | 0.0010 | 0.8059 | 0.0476 | 16.93 | 60 |
| Example 6 | 99.3400 | 0.0119 | 0.0358 | 0.0003 | 0.0002 | 0.0010 | 0.6048 | 0.0477 | 12.68 | 60 |
| Example 7 | 99.3081 | 0.0094 | 0.0735 | 0.0007 | 0.0002 | 0.0008 | 0.6050 | 0.0829 | 7.30 | 60 |
| Example 8 | 99.3262 | 0.0119 | 0.0358 | 0.0003 | 0.0002 | 0.0213 | 0.5983 | 0.0477 | 12.54 | 60 |
| Example 9 | 99.3912 | 0.0215 | 0.0482 | 0.0023 | 0.0002 | 0.0005 | 0.5360 | 0.0698 | 7.68 | 60 |
| Example 10 | 99.5445 | 0.0120 | 0.0360 | 0.0003 | 0.0002 | 0.0010 | 0.4000 | 0.0480 | 8.33 | 60 |
| Example 11 | 99.3444 | 0.0119 | 0.0358 | 0.0003 | 0.0002 | 0.0010 | 0.6005 | 0.0477 | 12.58 | 60 |
| Example 12 | 96.9130 | 0.0116 | 0.0349 | 0.0003 | 0.0002 | 0.0010 | 3.0331 | 0.0465 | 65.17 | 60 |

TABLE 2

| | Composition (Mass %) | | | | | | | Ratio (Si + Fe) | Mn/ (Si + Fe) | Thickness (μm) |
|---|---|---|---|---|---|---|---|---|---|---|
| | Al | Si | Fe | Cu | Mg | Zn | Mn | | | |
| Comparative Example 1 | 99.6278 | 0.0147 | 0.0408 | 0.0010 | 0.0003 | 0.0014 | 0.3079 | 0.0555 | 5.54 | 35 |
| Comparative Example 2 | 99.3555 | 0.0676 | 0.5647 | 0.0116 | 0.0006 | 0.0000 | 0.0000 | 0.6323 | 0.00 | 35 |
| Comparative Example 3 | 99.2751 | 0.0623 | 0.0358 | 0.0003 | 0.0002 | 0.0010 | 0.6194 | 0.0981 | 6.32 | 60 |
| Comparative Example 4 | 99.2013 | 0.0474 | 0.1130 | 0.0014 | 0.0009 | 0.0011 | 0.6146 | 0.1604 | 3.83 | 60 |
| Comparative Example 5 | 99.1442 | 0.0993 | 0.1129 | 0.0014 | 0.0009 | 0.0011 | 0.6200 | 0.2122 | 2.92 | 60 |
| Comparative Example 6 | 98.6637 | 0.0118 | 0.0355 | 0.0003 | 0.0002 | 0.4805 | 0.8020 | 0.0474 | 16.93 | 60 |
| Comparative Example 7 | 99.0060 | 0.0161 | 0.0357 | 0.0003 | 0.0002 | 0.0430 | 0.8928 | 0.0518 | 17.24 | 60 |
| Comparative Example 8 | 99.0379 | 0.1174 | 0.0357 | 0.0003 | 0.0002 | 0.0010 | 0.8016 | 0.1531 | 5.24 | 60 |
| Comparative Example 9 | 99.2675 | 0.0687 | 0.0407 | 0.0004 | 0.0002 | 0.0010 | 0.6146 | 0.1094 | 5.62 | 60 |
| Comparative Example 10 | 99.2257 | 0.0119 | 0.0357 | 0.0992 | 0.0002 | 0.0010 | 0.6204 | 0.0477 | 13.02 | 60 |
| Comparative Example 11 | 99.3108 | 0.0119 | 0.0358 | 0.0256 | 0.0002 | 0.0010 | 0.6088 | 0.0477 | 12.76 | 60 |
| Comparative Example 12 | 99.0062 | 0.0540 | 0.0987 | 0.0236 | 0.0027 | 0.0055 | 0.8007 | 0.1526 | 5.25 | 60 |
| Comparative Example 13 | 99.3664 | 0.0088 | 0.0207 | 0.0005 | 0.0003 | 0.0003 | 0.5993 | 0.0295 | 20.28 | 60 |

TABLE 2-continued

| | Composition (Mass %) | | | | | | | Ratio Mn/ | Thickness |
| | Al | Si | Fe | Cu | Mg | Zn | Mn | (Si + Fe) | (Si + Fe) | (μm) |
|---|---|---|---|---|---|---|---|---|---|---|
| Comparative Example 14 | 99.3612 | 0.0050 | 0.0114 | 0.0004 | 0.0003 | 0.0002 | 0.6013 | 0.0164 | 36.76 | 60 |
| Comparative Example 15 | 99.2933 | 0.0109 | 0.0853 | 0.0008 | 0.0002 | 0.0009 | 0.6059 | 0.0962 | 6.30 | 60 |
| Comparative Example 16 | 99.3444 | 0.0119 | 0.0358 | 0.0003 | 0.0002 | 0.0010 | 0.6005 | 0.0477 | 12.58 | 60 |
| Comparative Example 17 | 99.0675 | 0.0317 | 0.0789 | 0.0009 | 0.0006 | 0.0010 | 0.8054 | 0.1106 | 7.28 | 60 |
| Comparative Example 18 | 99.0675 | 0.0317 | 0.0789 | 0.0009 | 0.0006 | 0.0010 | 0.8054 | 0.1106 | 7.28 | 60 |
| Comparative Example 19 | 99.0188 | 0.0200 | 0.0500 | 0.0023 | 0.0006 | 0.0023 | 0.9000 | 0.0700 | 12.86 | 150 |

Each of the aluminum alloy foils of Examples 1 to 12 of the present embodiment and Comparative Examples 1 to 15 and 17 was produced in the following manner: molten aluminum adjusted to have a predetermined composition is casted to produce an aluminum alloy plate and the aluminum alloy plate is further cold-rolled. Each of the aluminum alloy foils of Comparative Examples 16 and 18 was produced in the following manner: molten aluminum adjusted to have a predetermined composition is casted to produce an aluminum alloy plate, the aluminum alloy plate is subjected to homogenization heat treatment, and the aluminum alloy plate is then cold-rolled. The aluminum alloy foil of Comparative Example 19 was produced in the following manner: molten aluminum adjusted to have a predetermined composition is casted to produce an aluminum alloy plate, the aluminum alloy plate is subjected to homogenization heat treatment and hot rolling, and then the obtained hot-rolled member is cold-rolled.

In each of Examples 1, 3 to 10 and 12 of the present embodiment and Comparative Examples 1 to 15 and 17, an aluminum alloy plate having a thickness of 6 mm was prepared by melting and casting with a cooling rate of about 100° C./second. Next, the aluminum alloy plates were cold-rolled multiple times to produce aluminum alloy foils having compositions and thicknesses shown in Tables 1 and 2. That is, Examples 1, 3 to 10 of the present embodiment were produced by the same production method as that for Comparative Examples 1 to 15 and 17, and Examples 1, 3 to 10 of the present embodiment and Comparative Examples 1 to 15 and 17 were different only in terms of compositions.

In each of Examples 2 and 11 of the present embodiment, first, aluminum alloy plates each having a thickness of 15 mm were prepared by melting and casting with a cooling rate of more than or equal to 1° C./second and less than or equal to 5° C./second. Next, the aluminum alloy plates were cold-rolled multiple times to produce aluminum alloy foils having compositions and thicknesses shown in Tables 1 and 2.

In Comparative Example 16, an aluminum alloy plate having a thickness of 15 mm was prepared by melting and casting with a cooling rate of more than or equal to 1° C./second and less than or equal to 5° C./second. Next, the aluminum alloy plate was subjected to homogenization heat treatment. The homogenization heat treatment was performed under such conditions that a heating temperature was 550° C. and a heating time was 10 hours. Next, the aluminum alloy plate was cold-rolled multiple times to produce an aluminum alloy foil having composition and thickness shown in Table 2.

In Comparative Example 18, an aluminum alloy plate having a thickness of 6 mm was prepared by melting and casting with a cooling rate of about 100° C./second. Next, the aluminum alloy plate was subjected to homogenization heat treatment. The homogenization heat treatment was performed under such conditions that a heating temperature was 550° C. and a heating time was 10 hours. Next, the aluminum alloy plate was cold-rolled multiple times to produce an aluminum alloy foil having composition and thickness shown in Table 2.

In Comparative Example 19, an aluminum alloy plate having a thickness of 500 mm was prepared by melting and casting with a cooling rate of more than or equal to 0.5° C./second and less than or equal to 5° C./second. Next, the aluminum alloy plate was subjected to homogenization heat treatment. The homogenization heat treatment was performed under such conditions that a heating temperature was 610° C. and a heating time was 10 hours. Next, the aluminum alloy plate was hot-rolled to have a thickness of 7 mm and then was cold-rolled multiple times to produce an aluminum alloy foil having composition and thickness shown in Table 2.

In each of Examples 1 to 12 of the present embodiment and Comparative Examples 1 to 19, the conditions of the cold rolling were adjusted such that each surface roughness Ra of the finally obtained aluminum alloy foil in directions parallel to and perpendicular to the rolling direction became less than or equal to 0.2 μm. Surface roughness Ra is a center line average roughness Ra defined in JIS B 0601 (1982 Edition).

Regarding each of the compositions shown in Tables 1 and 2, 1.00 g of a test piece was sampled as a measurement target from a corresponding aluminum alloy foil prepared as described above and was measured using an inductively coupled plasma atomic emission spectrometer (ICPS-8100 manufactured by Shimadzu Corporation).

Each of the samples prepared in this way was evaluated by the following evaluation methods. Evaluation results are shown in Tables 1 to 4. It should be noted that each of the surfaces evaluated in the samples had a center line average roughness Ra of less than or equal to 0.2 μm.

<Evaluation Methods>
(1) Number Density and Area Ratio of Second Phase Particles For measurement of the number density and area ratio of the second phase particles in the surface of each aluminum alloy foil, a reflection electron image obtained by observing the surface having a center line average roughness Ra of less than or equal to 0.2 μm with a scanning electron microscope (SEM) was used. Specifically, first, in the reflected electron image of each sample surface, five randomly selected quadrangular visual fields were observed. Each of the quadrangular visual fields was a quadrangular visual field of 0.01228 mm$^2$ (128.2 µm×95.8 µm). The reflected electron image of each quadrangular visual field was subjected to a binarization process using image processing software WinRoof 2018 provided by Mitani Corporation, thereby extracting second phase particles each having an equivalent circle diameter of more than or equal to 1.5 µm. For conditions of the observation of the reflected electron image, brightness, contrast, and voltage/current value of electron beam were set such that luminances of elements other than the second phase particles, such as rolling streak and oil pit, in the quadrangular visual field image fall within a range of more than or equal to 0 and less than or equal to 70 to 130 in luminance extraction of a look-up table conversion before the binarization process. Specifically, the extraction by the binarization process was performed in the following manner. First, in order to remove the elements other than the second phase particles such as rolling streak and oil pit in the obtained quadrangular visual field image, the luminance extraction of the lookup table conversion was performed while adjusting its lower limit value between 70 and 130 with its upper limit value being fixed to 255. Next, a binarization process using a single threshold value was performed under such a condition that the threshold value was 1.0, and then particles each having an equivalent circle diameter of less than 1.5 µm among the extracted particles were deleted. The number density and area ratio of the extracted second phase particles each having an equivalent circle diameter of more than or equal to 1.5 µm in the plane were calculated, and the average of calculation results obtained from the five quadrangular visual fields was used as an evaluation result.

(2) Vickers Hardness

The Vickers hardness of the surface of each aluminum alloy foil was measured using a Vickers hardness meter HMV-1 manufactured by Shimadzu Corporation. Specifically, the Vickers hardness (HV0.025) was measured by pressing, at a test force of 245.2 mN for 5 seconds, a diamond indenter onto each sample fixed on a glass plate having a thickness of 3 mm.

(3) Moisture/Heat Resistance Evaluation Test

A moisture/heat resistance evaluation test was performed in the following manner: a test piece of 40 mm×40 mm was cut out from each aluminum alloy foil as an evaluation target and the test piece was left for 12 hours in a high-temperature and high-humidity atmosphere having a temperature of 120° C. and a humidity of 100% with a pressure larger than the atmospheric pressure being applied to the test piece. An amount of increase in weight of the test piece after the test with respect to the weight of the test piece before the test was measured to evaluate moisture/heat resistance in accordance with the amount of increase in weight caused by oxidation corrosion of the surface thereof under the high-temperature and high-humidity atmosphere.

(4) Salt Water Resistance Evaluation Test

A salt water resistance evaluation test was performed in accordance with the test condition of neutral salt spray testing defined in JIS Z 2371 with a test piece of 15 mm×10 mm being cut out from each aluminum alloy foil as an evaluation target. A spraying time was 48 hours. Next, in a reflected electron image of each sample surface, five randomly selected quadrangular visual fields were observed. Each quadrangular visual field was a quadrangular visual field of 0.01228 mm$^2$ (128.2 µm×95.8 µm). The reflected electron image of each quadrangular visual field was subjected to a binarization process using image processing software WinRoof 2018 provided by Mitani Corporation, thereby extracting corrosion (pitting corrosion) generated portions each having an equivalent circle diameter of more than or equal to 1.0 µm. For conditions of the observation of the reflected electron image, brightness, contrast, and voltage/current value of electron beam were set such that luminances of elements other than the corrosion (pitting corrosion) generated portion, such as rolling streak and oil pit, in the quadrangular visual field image fall within a range of more than or equal to 70 to 130 and less than or equal to 255 in luminance extraction of a look-up table conversion before the binarization process. Specifically, the extraction by the binarization process was performed in the following manner. First, in order to remove the elements other than the corrosion (pitting corrosion) generated portions such as rolling streak and oil pit in the obtained quadrangular visual field image, the luminance extraction of the lookup table conversion was performed while adjusting its upper limit value between 70 and 130 with its lower limit value being fixed to 0. Next, a binarization process using a single threshold value was performed under such a condition that a threshold value was 254, and then corrosion (pitting corrosion) generated portions each having an equivalent circle diameter of less than 1.0 µm among the extracted corrosion (pitting corrosion) generated portions were deleted. The area ratio of the extracted corrosion (pitting corrosion) generated portions each having an equivalent circle diameter of more than or equal to 1.0 µm was calculated, and the average of calculation results obtained from the five quadrangular visual fields was used as an evaluation result.

(5) Content of Iron in Second Phase Particles Filtered by 1-µm Filter 0.1 g of a sample was collected from each aluminum alloy foil and the sample was dissolved in phenol. The obtained solution was filtered by a filter having an average equivalent circle diameter of 1 µm, thereby capturing the second phase particles. The captured second phase particles were dissolved using acid and alkali. A solution having 75 volume % of hydrochloric acid and 25 volume % of nitric acid was used for the acid, whereas a 5 volume % sodium hydroxide aqueous solution was used for the alkali. The mass of the iron in the obtained solution was measured using an inductively coupled plasma atomic emission spectrometer (ICPS-8100 manufactured by Shimadzu Corporation). A numerical value obtained by dividing the mass of the iron in the second phase particles by the total mass of the dissolved aluminum alloy foil sample was regarded as the content of the iron in the second phase particles.

Evaluation results are shown in Tables 3 and 4.

TABLE 3

| | Second Phase Particle Distribution | | Content of Fe in Second Phase Particles (Mass ppm) | Moisture/ Heat Resistance Test Amount of Increase in Weight (g/m$^2$) | Salt Water Resistance Test Area Ratio of Pitting Corrosion (%) | Vickers Hardness HV0.025 (HV) |
|---|---|---|---|---|---|---|
| | Area Ratio (%) | Number Density (/0.01228 mm$^2$) | | | | |
| Example 1 | 0.00 | 0.00 | 210 | 0.09 | 0.55 | 59.8 |
| Example 2 | 0.01 | 0.33 | 230 | 0.19 | 0.80 | 60.4 |
| Example 3 | 0.02 | 1.00 | 170 | 0.12 | 0.40 | 64.2 |
| Example 4 | 0.03 | 0.67 | 190 | 0.09 | 0.35 | 75.7 |
| Example 5 | 0.02 | 1.00 | 160 | 0.22 | 0.78 | 55.9 |

TABLE 3-continued

| | Second Phase Particle Distribution | | Content of Fe in Second Phase Particles (Mass ppm) | Moisture/ Heat Resistance Test Amount of Increase in Weight (g/m²) | Salt Water Resistance Test Area Ratio of Pitting Corrosion (%) | Vickers Hardness HV0.025 (HV) |
|---|---|---|---|---|---|---|
| | Area Ratio (%) | Number Density (/0.01228 mm²) | | | | |
| Example 6 | 0.01 | 0.33 | 140 | 0.25 | 0.35 | 55.0 |
| Example 7 | 0.00 | 0.00 | 340 | 0.22 | 0.82 | 55.1 |
| Example 8 | 0.03 | 1.00 | 200 | 0.38 | 0.92 | 58.2 |
| Example 9 | 0.06 | 3.00 | 170 | 0.25 | 0.75 | 55.7 |
| Example 10 | 0.00 | 0.00 | 130 | 0.31 | 0.59 | 56.1 |
| Example 11 | 0.04 | 1.67 | 130 | 0.34 | 0.94 | 62.2 |
| Example 12 | 0.00 | 0.00 | 180 | 0.19 | 0.54 | 78.5 |

TABLE 4

| | Second Phase Particle Distribution | | Content of Fe in Second Phase Particles (Mass ppm) | Moisture/ Heat Resistance Test Amount of Increase in Weight (g/m²) | Salt Water Resistance Test Area Ratio of Pitting Corrosion (%) | Vickers Hardness HV0.025 (HV) |
|---|---|---|---|---|---|---|
| | Area Ratio (%) | Number Density (/0.01228 mm²) | | | | |
| Comparative Example 1 | 0.02 | 1.00 | 170 | 0.31 | 0.62 | 50.8 |
| Comparative Example 2 | 0.74 | 28.00 | 3310 | 0.06 | 9.04 | 68.6 |
| Comparative Example 3 | 0.08 | 4.00 | 180 | 0.16 | 1.18 | 65.9 |
| Comparative Example 4 | 0.12 | 6.00 | 450 | 0.06 | 2.34 | 64.1 |
| Comparative Example 5 | 0.11 | 4.00 | 480 | 0.09 | 5.23 | 65.4 |
| Comparative Example 6 | 0.03 | 2.00 | 170 | 0.19 | 20.25 | 56.5 |
| Comparative Example 7 | 0.01 | 0.67 | 140 | 0.16 | 14.03 | 63.3 |
| Comparative Example 8 | 0.00 | 0.00 | 140 | 0.25 | 4.18 | 69.8 |
| Comparative Example 9 | 0.00 | 0.00 | 190 | 0.19 | 1.10 | 65.4 |
| Comparative Example 10 | 0.00 | 0.00 | 130 | 0.13 | 6.06 | 65.4 |
| Comparative Example 11 | 0.02 | 1.33 | 130 | 0.19 | 5.50 | 60.6 |
| Comparative Example 12 | 0.02 | 1.00 | 490 | 0.22 | 4.96 | 57.6 |
| Comparative Example 13 | 0.00 | 0.00 | 170 | 0.84 | 0.55 | 53.6 |
| Comparative Example 14 | 0.00 | 0.00 | 40 | 1.06 | 0.06 | 53.5 |
| Comparative Example 15 | 0.02 | 1.33 | 430 | 0.16 | 1.33 | 60.1 |
| Comparative Example 16 | 0.10 | 4.00 | 180 | 0.22 | 3.71 | 57.4 |
| Comparative Example 17 | 0.07 | 3.67 | 340 | 0.16 | 1.67 | 61.5 |
| Comparative Example 18 | 0.24 | 8.67 | 380 | 0.16 | 5.63 | 59.9 |
| Comparative Example 19 | 0.64 | 16.50 | 270 | 0.09 | 1.52 | 60.5 |

<Evaluation Results>

The present inventors performed the above-described salt water resistance evaluation test on the aluminum alloy foil of WO 2018/123933, and confirmed that the area ratio of the pitting corrosion generated portions was more than or equal to 1.5% in some cases. As a result of diligent study, the present inventors found that each of the aluminum alloy foils of Examples 1 to 11 of the present embodiment has salt water resistance higher than that of the aluminum alloy foil of WO 2018/123933 and has moisture/heat resistance and surface hardness comparable to those of the aluminum alloy foil of WO 2018/123933. Further, the present inventors confirmed that in each of the aluminum alloy foils of Examples 1 to 11 of the present embodiment, the number density of the second phase particles each having an equivalent circle diameter of more than or equal to 1.5 μm is less than or equal to 10/0.01228 mm² and the area ratio of the second phase particles is less than or equal to 0.1%.

Each of the aluminum alloy foils of Examples 1 to 12 of the present embodiment includes: aluminum; silicon; more than or equal to 0.4 mass % and less than or equal to 3.04 mass % of manganese; more than or equal to 0.03 mass % and less than or equal to 0.08 mass % of iron; more than or equal to 0.00001 mass % and less than or equal to 0.03 mass % of zinc; more than or equal to 0.00001 mass % and less than or equal to 0.02 mass % of copper; and more than or equal to 0.00001 mass % and less than or equal to 0.01 mass % of magnesium. Further, in each of the aluminum alloy foils of Examples 1 to 11 of the present embodiment, the total of the content of the silicon and the content of the iron was less than or equal to 0.1 mass %, and the ratio of the content of the manganese to the total mass of the silicon and the iron was more than or equal to 7.0. Further, in each of the aluminum alloy foils of Examples 1 to 11 of the present embodiment, the number density of the second phase particles each having an equivalent circle diameter of more than or equal to 1.5 μm was less than or equal to 10/0.01228 mm², and the area ratio of the second phase particles was less than or equal to 1%. In each of the aluminum alloy foils of Examples 1 to 11 of the present embodiment, the amount of increase in weight in the moisture/heat resistance evaluation test was less than or equal to 0.4 g/mm², the area ratio of the pitting corrosion generated portions in the salt water resistance evaluation test was less than or equal to 1.0%, and the Vickers hardness was more than or equal to 55 HV.

On the other hand, in each of the aluminum alloy foils of Comparative Examples 1 to 19, at least one of the composition, the total of the content of the silicon and the content of the iron, the ratio of the content of the manganese to the total mass of the silicon and the iron, and the number density and area ratio of the second phase particles fell out of a corresponding one of the above-described numerical ranges. In each of such aluminum alloy foils of Comparative Examples 1 to 19, at least one of the amount of increase in weight in the moisture/heat resistance evaluation test, the area ratio of the pitting corrosion generated portions in the salt water resistance evaluation test, and the Vickers hardness was inferior to that of each of the aluminum alloy foils of Examples 1 to 11 of the present embodiment. For example, in the aluminum alloy foil of Comparative Example 1, the Vickers hardness was less than 55 HV. In each of the aluminum alloy foils of Comparative Examples 2 to 12 and 15 to 19, the area ratio of the pitting corrosion generated portions in the salt water resistance evaluation test was more than 1.0%. In each of the aluminum alloy foils of Comparative Examples 13 and 14, the amount of increase in weight in the moisture/heat resistance evaluation test was more than 0.4 g/mm². In particular, in each of the aluminum alloy foils of Comparative Examples 2, 4, 5, 12 and 15 in each of which the content of the iron was more than 0.08 mass %, the area ratio of the pitting corrosion generated portions in the salt water resistance evaluation test was more than 1.0%. Further, in the aluminum alloy foil of Comparative Example 14 in which the content of the iron was less than 0.03 mass %, the amount of increase in weight in the moisture/heat resistance evaluation test was more than 0.4 g/mm² and the Vickers hardness was less than 55 HV.

Regarding Comparative Examples 1 to 15 and 17 each produced by the same production method as that for each of Examples 1, 3 to 10 and 12 of the present embodiment but each different therefrom in terms of the compositions, for example, Comparative Example 2 is different from Examples 1, 3 to 10 of the present embodiment in that no manganese was included and the ratio of the content of the manganese to the total mass of the silicon and the iron was less than 7.0. Further, in Comparative Example 2, the area ratio of the second phase particles was more than 0.1%, and the number density of the second phase particles was more than 10/0.01228 mm². Comparative Example 3 is different from Examples 1 and 3 to 10 of the present embodiment in that the above-described ratio was less than 7.0. In view of such results, the present inventors consider that in the aluminum alloy foil in which the above-described ratio is less than 7.0, a large amount of Al—Fe-based second phase particles or Al—Fe—Si-based second phase particles are formed as compared with the aluminum alloy foil in which the above-described ratio is more than or equal to 7.0 as described above, with the result that pitting corrosion is likely to occur due to salt water.

Regarding Comparative Examples 16, 18, and 19 that are equivalent to Examples 1 to 12 of the present embodiment in terms of the compositions but that are different therefrom in terms of the production methods, for example, each of Comparative Examples 16 and 18 is different from Examples 1 to 11 of the present embodiment in that the homogenization heat treatment was applied to the ingot before the cold rolling. Further, in each of Comparative Examples 16 and 18, the area ratio of the second phase particles was more than 0.1%. Comparative Example 19 is different from Examples 1 to 11 of the present embodiment in that the ingot before the cold rolling was subjected to the homogenization heat treatment and the hot rolling. In Comparative Example 19, the area ratio of the second phase particles was more than 0.1%, and the number density of the second phase particles was more than 10/0.01228 mm². In view of such results, the present inventors consider that in the aluminum alloy foil fed with an amount of heat sufficient to grow the second phase particles, a large amount of second phase particles each having an equivalent circle diameter of more than or equal to 1.5 μm are formed even though the aluminum alloy foil has a composition equivalent to that of each of Examples 1 to 11 of the present embodiment, with the result that pitting corrosion is likely to occur due to salt water.

The embodiments and examples disclosed herein are illustrative and non-restrictive in any respect. The scope of the present invention is defined by the terms of the claims, rather than the embodiments and examples described above, and is intended to include any modifications and variations within the scope and meaning equivalent to the terms of the claims.

REFERENCE SIGNS LIST

1A: first surface; 1B: second surface; 10: laminate; 11: first layer.

The invention claimed is:

1. An aluminum alloy foil having a first surface, the aluminum alloy foil comprising:
   aluminum;
   silicon;
   more than or equal to 0.4 mass % and less than or equal to 3.04 mass % of manganese;
   more than or equal to 0.03 mass % and less than or equal to 0.08 mass % of iron;
   more than or equal to 0.00001 mass % and less than or equal to 0.03 mass % of zinc;
   more than or equal to 0.00001 mass % and less than or equal to 0.02 mass % of copper; and
   more than or equal to 0.00001 mass % and less than or equal to 0.01 mass % of magnesium, wherein
   in the aluminum alloy foil, a total of a content of the silicon and a content of the iron is less than or equal to 0.1 mass %,
   in the aluminum alloy foil, a ratio of a mass of the manganese to a total mass of the silicon and the iron is more than or equal to 7.0 and less than or equal to 12.75, and
   in the first surface, an area ratio of second phase particles each having an equivalent circle diameter of more than or equal to 1.5 μm is less than or equal to 0.1%.

2. The aluminum alloy foil according to claim 1, wherein in the first surface, the number of the second phase particles per unit area is less than or equal to 10/0.01228 mm2.

3. The aluminum alloy foil according to claim 2, wherein a material of each of the second phase particles includes at least one element selected from a group consisting of the silicon, the manganese, and the iron.

4. The aluminum alloy foil according to claim 3, wherein a content of the iron obtained when using a filter having an average equivalent circle diameter of 1 μm to filter a solution obtained by dissolving the aluminum alloy foil in phenol is more than or equal to 100 mass ppm and less than or equal to 400 mass ppm with respect to a total mass of the aluminum alloy foil yet to be dissolved.

5. The aluminum alloy foil according to claim 1, wherein a Vickers hardness of the first surface is more than or equal to 55 HV.

6. The aluminum alloy foil according to claim 1, wherein a thickness of the aluminum alloy foil in a direction intersecting the first surface is more than or equal to 5 μm and less than or equal to 300 μm.

7. The aluminum alloy foil according to claim 2, wherein a Vickers hardness of the first surface is more than or equal to 55 HV.

8. The aluminum alloy foil according to claim 3, wherein a Vickers hardness of the first surface is more than or equal to 55 HV.

9. The aluminum alloy foil according to claim 4, wherein a Vickers hardness of the first surface is more than or equal to 55 HV.

10. The aluminum alloy foil according to claim 2, wherein a thickness of the aluminum alloy foil in a direction intersecting the first surface is more than or equal to 5 μm and less than or equal to 300 μm.

11. The aluminum alloy foil according to claim 3, wherein a thickness of the aluminum alloy foil in a direction intersecting the first surface is more than or equal to 5 μm and less than or equal to 300 μm.

12. The aluminum alloy foil according to claim 4, wherein a thickness of the aluminum alloy foil in a direction intersecting the first surface is more than or equal to 5 μm and less than or equal to 300 μm.

13. The aluminum alloy foil according to claim 5, wherein a thickness of the aluminum alloy foil in a direction intersecting the first surface is more than or equal to 5 μm and less than or equal to 300 μm.

14. A laminate comprising:
the aluminum alloy foil according to claim 1; and
a first layer disposed on at least one of the first surface of the aluminum alloy foil and a second surface of the aluminum alloy foil opposite to the first surface, wherein
a total value of a thickness of the aluminum alloy foil and a thickness of the first layer in a direction intersecting the first surface is more than or equal to 6 μm and less than or equal to 301 μm.

15. A laminate comprising:
the aluminum alloy foil according to claim 2; and
a first layer disposed on at least one of the first surface of the aluminum alloy foil and a second surface of the aluminum alloy foil opposite to the first surface, wherein
a total value of a thickness of the aluminum alloy foil and a thickness of the first layer in a direction intersecting the first surface is more than or equal to 6 μm and less than or equal to 301 μm.

16. A laminate comprising:
the aluminum alloy foil according to claim 3; and
a first layer disposed on at least one of the first surface of the aluminum alloy foil and a second surface of the aluminum alloy foil opposite to the first surface, wherein
a total value of a thickness of the aluminum alloy foil and a thickness of the first layer in a direction intersecting the first surface is more than or equal to 6 μm and less than or equal to 301 μm.

17. A laminate comprising:
the aluminum alloy foil according to claim 4; and
a first layer disposed on at least one of the first surface of the aluminum alloy foil and a second surface of the aluminum alloy foil opposite to the first surface, wherein
a total value of a thickness of the aluminum alloy foil and a thickness of the first layer in a direction intersecting the first surface is more than or equal to 6 μm and less than or equal to 301 μm.

18. A laminate comprising:
the aluminum alloy foil according to claim 5; and
a first layer disposed on at least one of the first surface of the aluminum alloy foil and a second surface of the aluminum alloy foil opposite to the first surface, wherein
a total value of a thickness of the aluminum alloy foil and a thickness of the first layer in a direction intersecting the first surface is more than or equal to 6 μm and less than or equal to 301 μm.

19. A method of producing an aluminum alloy foil, the method comprising:
preparing an ingot by melting and casting; and
cold-rolling the ingot without performing homogenization heat treatment and hot rolling, wherein
the ingot including
aluminum,
silicon,
more than or equal to 0.4 mass % and less than or equal to 3.04 mass % of manganese,
more than or equal to 0.03 mass % and less than or equal to 0.08 mass % of iron,
more than or equal to 0.00001 mass % and less than or equal to 0.03 mass % of zinc,
more than or equal to 0.00001 mass % and less than or equal to 0.02 mass % of copper, and
more than or equal to 0.00001 mass % and less than or equal to 0.01 mass % of magnesium,
a total of a content of the silicon and a content of the iron is less than or equal to 0.1 mass %,
a ratio of a mass of the manganese to a total mass of the silicon and the iron is more than or equal to 7.0 and less than or equal to 12.75, and
each of an area ratio of second phase particles each having an equivalent circle diameter of more than or equal to 1.5 μm in a surface of the ingot to be cold-rolled in the cold-rolling, and an area ratio of the second phase particles in the surface of the ingot prepared in the preparing is less than or equal to 0.1%.

20. A method of producing a laminate, the method comprising:
preparing the aluminum alloy foil produced by the method of producing the aluminum alloy foil according to claim 19; and
forming a first layer on at least one of a first surface of the aluminum alloy foil and a second surface of the aluminum alloy foil opposite to the first surface.

* * * * *